Figure 1:
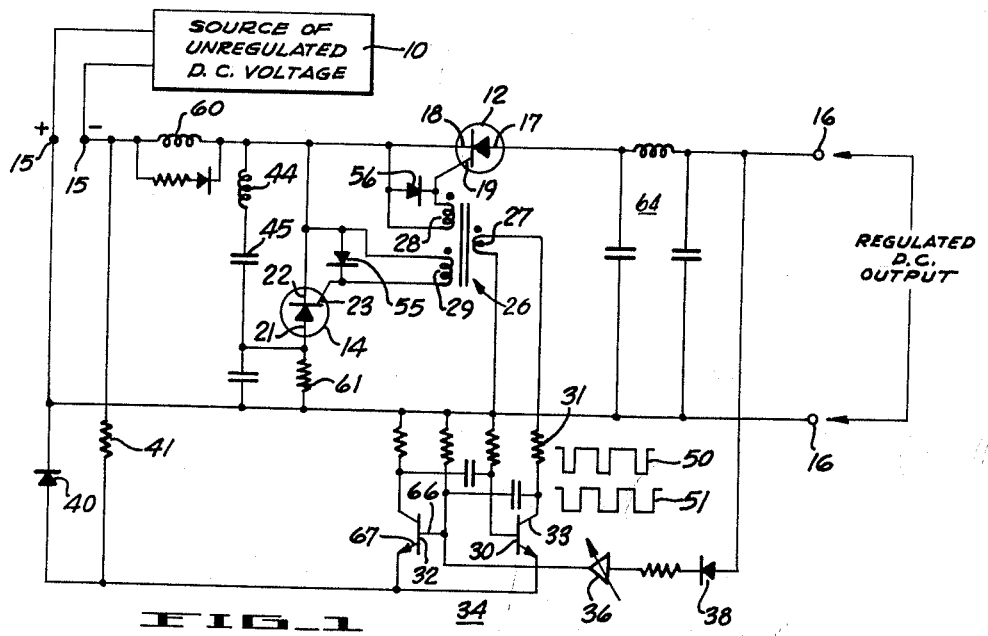

March 16, 1965

A. LICHOWSKY 3,174,096

D.C. VOLTAGE REGULATING CIRCUIT

Filed June 23, 1961

ABRAHAM LICHOWSKY
INVENTOR.

BY Robert D. Clay

ATTORNEY

United States Patent Office 3,174,096
Patented Mar. 16, 1965

3,174,096
D.C. VOLTAGE REGULATING CIRCUIT
Abraham Lichowsky, San Carlos, Calif., assignor to Ampex Corporation, Redwood City, Calif., a corporation of California
Filed June 23, 1961, Ser. No. 119,191
12 Claims. (Cl. 323—22)

This invention relates to voltage regulating circuits and more particularly to such circuits employing solid state devices as control elements.

Because of the common need to provide a stabilized output voltage which is derivable from an input voltage that may occasionally fluctuate rather widely, voltage regulating circuits are well known in the art. The most common of these employ a vacuum tube or a transistor as a series regulating element, the conductance of which may be controlled in accordance with the output or load voltage. However, regulating circuits of this type are necessarily subject to a voltage drop and a power loss within the regulating element. As a result the power which may be transmitted to the load through a regulating circuit of this type is necessarily limited, and furthermore the maximum available output voltage is diminished from the input or line voltage by the amount of the voltage drop across the regulating element.

Because of the advantages such as smaller size, increased reliability and simplified associated circuitry inherent in solid state devices as compared with vacuum tubes, voltage regulating circuits employing semiconductors have substantially replaced those utilizing vacuum tubes. Transistors, however, have not proved to be completely satisfactory for such applications in view of their limited voltage and current ratings. Thus the control of large currents at substantially high voltage is practically impossible with transistors. A device which has been more recently developed in order to overcome the inherent deficiencies in transistors and similar semiconductor devices when employed as voltage regulators is the silicon controlled rectifier. This device is designed to be used as a high current, high voltage, high efficiency switch and its ability to serve as such makes it a desirable solid state device for voltage regulation. The silicon controlled rectifier is a device of small size and is capable of operation at relatively high currents with low forward voltage drop. The triggering time of the silicon controlled rectifier is in the order of a few microseconds and the device may be cycled at a pulse repetition rate of several kilocycles. In addition the ratio of maximum conduction current to control current required for triggering is extremely high. It can be understood therefore that these advantages among others qualify the silicon controlled rectifier as a superior device for use in voltage regulating circuits. There are known arrangements including silicon controlled rectifiers for providing a regulated unidirectional or direct current (hereinafter D.C.) output from either alternating current (A.C.) or D.C. unregulated line sources. In general such arrangements as are known utilize phase control of the triggering of the silicon controlled rectifiers from the A.C. input line or from a separate source of triggering voltage in order to produce the desired voltage regulation. However, such phase controlled circuits sometimes present undesirable transient loading of the input line and are also limited in the stability of regulation that they are able to achieve. Certain regulating circuits employing a saturable current transformer in conjunction with a silicon controlled rectifier have been developed to overcome these disadvantages; but such arrangements also have not been entirely satisfactory, because the operation of the circuit is critically related to the design of the saturable current transformer. Furthermore, these circuits depend upon triggering a series silicon controlled rectifier at a repetition rate that varies in accordance with output voltage. Because this repetition rate is developed in a frequency controlled oscillator, the regulating circuit is necessarily subject to frequency variations that may result from other causes, such as ambient temperature variations and the like.

It is therefore a general object of this invention to provide an improved D.C. voltage regulating circuit employing silicon controlled rectifiers.

It is an object of this invention to provide improved stability and independence from effects of environmental variations in a voltage regulating circuit utilizing silicon controlled rectifiers.

It is a particular object of this invention to provide a voltage regulating circuit utilizing silicon controlled rectifiers in conjunction with a triggering signal generator wherein the resultant voltage regulation is substantially independent of frequency fluctuations of the triggering signal.

Briefly, in accordance with the invention, a circuit is provided for regulating the voltage from a D.C. source such as a rectifier wherein a pair of silicon controlled rectifiers are employed to provide the desired voltage regulation. One of the silicon controlled rectifiers is connected in series with the D.C. line while the other is connected across the line adjacent the first silicon controlled rectifier. The triggering circuits of both silicon controlled rectifiers are connected to separate pulse transformer windings. The pulse transformer windings are energized by a high frequency pulse source such as a controlled multivibrator which may advantageously be operating at a pulse repetition rate of up to 10 kilocycles per second. The output from the controlled multivibrator is differentiated in the associated pulse transformer, and the pulse transformer secondary windings are connected in opposite phase relationship to the respective silicon controlled rectifier triggering electrodes.

The operation of the circuit arrangements of the invention at a suitably high pulse repetition rate provides an optimum balance, dependent upon the switching time of the series-connected silicon controlled rectifier, between the respective filtering techniques for eliminating or controlling both high and low frequency harmonics of the frequency at which regulation is effected. At the same time the high pulse repetition rate employed in the present invention advantageously serves to reduce substantially the requirements imposed on the associated ripple filters, thus permitting the use of smaller components with a considerable saving in weight and cost.

In accordance with the invention a signal derived from the output terminals of the regulating circuit is applied to the multivibrator in order to control the duty cycle of its output waveform. The regulated output voltage provided by this arrangement varies in accordance with the proportion of the time during which the series silicon controlled rectifier is conducting. Because this silicon controlled rectifier is turned on by pulses of one polarity from its associated pulse transformer winding and is turned off when the second silicon controlled rectifier is turned on by pulses of the other polarity at the remaining pulse transformer winding, it can be seen that the variation of the duty cycle, or symmetry, of the waveform from the controlled multivibrator in response to variations in the regulated output voltage serves to establish the desired regulation thereof in accordance with the invention. The second silicon controlled rectifier, when triggered, is turned off after a brief period of conduction by a reverse current produced by an associated L-C network connected thereto.

In one specific arrangement of the invention, a single pulse transformer is employed having a pair of secondary windings for providing the triggering pulses with suitable phase relationship for the respective silicon controlled rectifiers. The primary winding is connected to one output of the multivibrator to provide a usable triggering pulse from one or the other of the secondary windings each time the multivibrator changes state.

In another specific arrangement of the invention, the triggering pulses for the respective silicon controlled rectifiers are developed by individual pulse transformers, each connected to a corresponding half of an associated free-running multivibrator. In this arrangement the multivibrator comprises a unijunction transistor connected as a relaxation oscillator which controls the conduction state of an associated semiconductor device.

Figure 2:
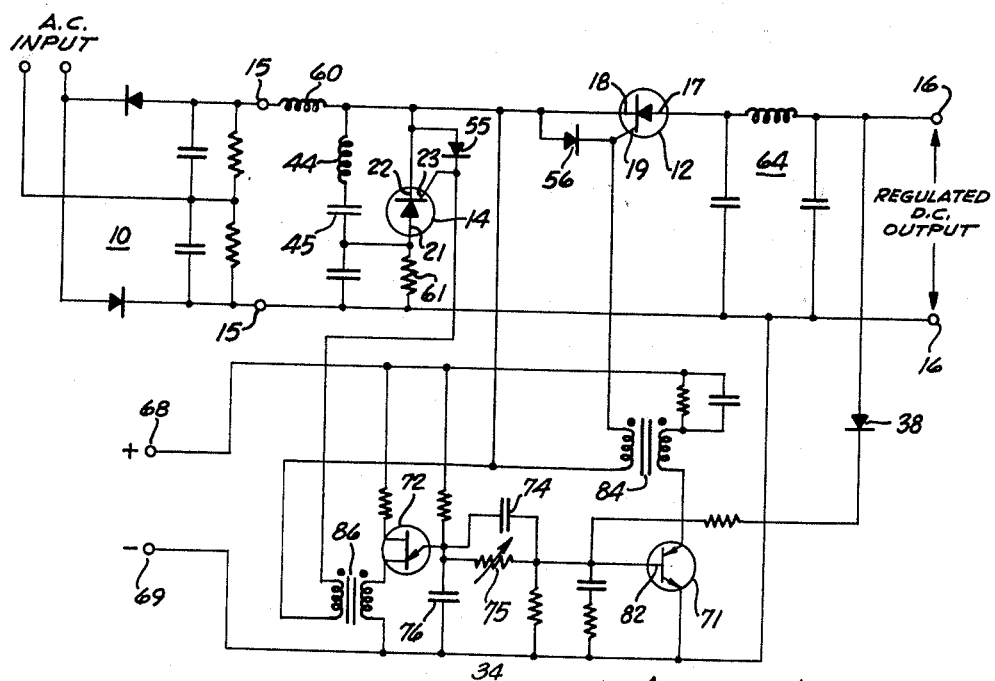

A better understanding of the invention may be gained from a consideration of the following detailed description taken in conjunction with the drawing in which:

FIGURE 1 is a schematic representation of one specific arrangement of the invention; and FIGURE 2 is a schematic representation of another specific arrangement of the invention.

In FIGURE 1, a source 10 of unregulated D.C. voltage is shown connected to the input terminals 15 of a regulating circuit in accordance with the invention comprising a pair of silicon controlled rectifiers 12 and 14. The silicon controlled recifier 12 is connected in series with one of the two D.C. lines between the input terminals 15 and the regulator circuit output terminals 16. The silicon controlled rectifier 14 is shown connected across the input terminals 15. The silicon controlled rectifier 12 has an anode 17, a cathode 18 and a gating, or triggering, electrode 19. Similarly the silicon controlled rectifier 14 is shown having corresponding electrodes 21, 22 and 23. A more detailed description of the silicon controlled rectifier may be found for example in "Solid-State Thyratrons Available Today," by T. P. Sylvan, pages 50–51 of "Electronics," March 6, 1959. For the purpose of understanding the invention however it will be sufficient to describe the device as presenting a high forward impedance between anode and cathode until the gating electrode is driven slightly positive with respect to the cathode. Thereafter the device is triggered to its On condition, maintaining a low forward impedance between anode and cathode until the current through the device decreases below a minimum value designated the holding current. When the forward current decreases below the holding current value, the device turns off and remains off until another positive signal is applied to the gating electrode.

In the circuit of FIGURE 1, a triggering arrangement for the silicon controlled rectifiers 12 and 14 is provided by the pulse transformer 26 shown having a primary winding 27 and secondary windings 28 and 29 respectively connected to the gating electrodes 19 and 23 of the silicon controlled rectifiers 12 and 14. The dots shown adjacent the respective windings 27, 28 and 29 of the transformer 26 are employed to indicate like polarities of induced voltage in the respective windings in accordance with convention. Thus, for example, when the upper end of the winding 27 is positive the upper ends of the windings 28 and 29 are also positive.

The primary winding 27 of the pulse transformer 26 is shown connected to a transistor 30 via a current limiting resistor 31. The transistor 30 is employed as one-half of a high frequency, free-running multivibrator 34, the other half of which includes a transistor 32 and interconnecting resistors and capacitors as shown. A feedback path for controlling the multivibrator 34 in accordance with the invention is shown comprising a conventional servo amplifier 36 and a zener diode 38 connected to the negative output terminal 16. The multivibrator 34 is itself connected between the positive side of the D.C. line and a bleeder network comprising a zener diode 40 and a resistor 41. The silicon controlled rectifier 14 is provided with a turnoff network comprising the inductance 44 and the capacitor 45.

In the operation of the circuit of the invention as shown in FIGURE 1, the silicon controlled rectifier 12 is turned on and off at a rapid rate by means of the multivibrator 34 and the silicon controlled rectifier 14 in order to stabilize the unregulated D.C. voltage from the source 10, thus serving to provide a steady D.C. voltage at a preselected value across the output terminals 16. In accordance with the invention the circuit of the multivibrator 34 is designed to provide a train of output pulses at a substantially constant repetition rate. Control of the voltage across the output terminals 16 by means of the silicon controlled rectifier 12 is effected by varying the proportion of time during which the silicon controlled rectifier 12 conducts. This is accomplished by changing the duty cycle of the waveform from the multivibrator 34, i.e., by changing the time it is On with respect to the time it is Off, without affecting its pulse repetition rate. Thus the invention advantageously provides regulation of the voltage at the output terminals 16 in a manner which is substantially independent of environmental changes to which those previously known voltage regulating circuits which are dependent upon frequency variation of the controlling circuit are subject.

To describe the operation of the circuit of FIGURE 1 in detail, let it be assumed that suitable regulation is being provided in response to the development of the waveform 50 which may be present at the collector 33 of the transistor 30. As the collector 33 goes positive, resulting from the turning on of the transistor 32 and the turning off of the transistor 30, a positive pulse is applied to the upper ends of the transformer windings 27, 28 and 29. The pulse in the winding 29 has no effect on the silicon controlled rectifier 14 and is effectively shorted by the diode 55. However the positive pulse at the upper end of the winding 28 is applied to the gating electrode 19 of the silicon controlled rectifier 12, thus triggering the rectifier 12 to the conducting condition. The silicon controlled rectifier 12 remains in the On condition, thus supplying current from the source 10 to the negative terminal 16 at the output of the regulator circuit. After a period of time which is determined by the characteristics of the transistors 30 and 32 and the time constants provided by the respective capacitors and resistors of the multivibrator 34, the transistor 32 turns off, while the transistor 30 turns on, thus driving the emitter 33 in the negative direction. As a result negative pulses are produced at the upper ends of the windings 28 and 29 of the pulse transformer 26. The negative pulse in the winding 28 has no effect upon the gating circuit of the silicon controlled rectifier 12 since the rectifier 12 is already conducting. This pulse is effectively shorted out by the diode 56. However, the induced pulse in the winding 29 which appears as a positive pulse at the lower end thereof drives the gating electrode 23 of the silicon controlled rectifier 14 positive, thus turning on the silicon controlled rectifier 14.

When the silicon controlled rectifier 14 turns on, the cathode 18 of the device 12 is instantaneously driven positive with respect to the anode 17. This effect is enhanced by the inductance 60 connected in series with the negative D.C. line from the source 10. Thus when the silicon controlled rectifier 14 conducts, the silicon controlled rectifier 12 is rapidly turned off, thus blocking the further passage of current to the output terminals 16. The self-quenching network comprising the inductance 44 and the capacitor 45 passes through one cycle of oscillation upon the turning on of the silicon controlled rectifier 14, thus presenting a reverse current which serves to extinguish conduction in the device 14. Consequently the silicon controlled rectifier 14, when triggered, serves to extinguish conduction in the silicon controlled rectifier 12 and is thereafter immediately turned off by the operation of the self-quenching circuit comprising the inductance 44 and the capacitor 45. The resistor 61 is included for the purpose of limiting current through the device 14 when the latter is triggered into conduction. Subsequently, when the collector 33 of the transistor 30 is driven positive by the next cycle of the multivibrator 34, the operation of the circuit including the silicon controlled rectifiers 12 and 14 is repeated as has just been described. The pulses of current passed through the device 12 are filtered in a conventional fashion by means of the filter 64.

Now let it be assumed that the voltage at the output terminals 16 tends to rise above the predetermined regulated value, as may occur from a change of load impedance or fluctuation in the voltage from the source 10. As a result the upper terminal 16 becomes more negative with respect to the lower terminal 16 and the change in voltage is applied through the zener diode 38 and the variable gain servo amplifier 36 to drive the base 66 of the transistor 32 more negative with respect to its emitter 67. As a result the transistor 32 turns off more readily than before and remains off for a longer period of time. In other words, the duty cycle of the multivibrator 34 is changed in a way which reduces the proportion of time that the silicon controlled rectifier 12 may conduct. Since the transistor 32 is off for a longer period of time the transistor 30 is on for a like interval and the spacing from a negative-going to a positive-going change in voltage at the collector 33 is increased with respect to the relative spacing previously present as shown by the waveform 50. Such a change from the waveform 50 is represented by the waveform 51 which may now be considered representative of the voltage at the collector 33 of the transistor 30. With the duty cycle of the output waveform at the collector 33 changed in this manner, the positive triggering pulse applied to the gating electrode 19 of the silicon controlled rectifier 12 is followed more closely by a positive triggering pulse at the gating electrode 23 of the silicon controlled rectifier 14. Thus in the operation of the circuit as described above, the silicon controlled rectifier 12 is turned off after a shorter period of conduction than during the development of the waveform 50. Consequently, the current flowing to the filter 64 through the silicon controlled rectifier 12 is reduced and as a result the voltage across the output terminals 16 is decreased in magnitude to compensate for the deviation from the preselected magnitude of output voltage. Thus it can be seen that any tendency of the output voltage to increase is compensated for in accordance with the invention by a change in the duty cycle of the output waveform of the multivibrator 34 which in turn controls the conduction time of the serially connected silicon controlled rectifier 12 to oppose the original increase in the output voltage. Similar compensation is provided when the output voltage exhibits a tendency to decrease below the regulated value by varying the duty cycle of the multivibrator 34 in a way which causes the silicon controlled rectifier 12 to pass more current to the filter 64 and the output terminals 16.

In the arrangement of the invention depicted in FIGURE 2, like reference numerals have been employed to designate elements corresponding to those shown in FIGURE 1. Thus, a pair of silicon controlled rectifiers 12 and 14 are alternately triggered in response to pulses received from a multivibrator 34. In the circuit of FIGURE 2 the source of unregulated D.C. voltage 10 is represented by a conventional voltage doubler rectifier circuit as is known in the art. The free-running multivibrator 34 in the arrangement of FIGURE 2 comprises a unijunction transistor 72 connected in a relaxation oscillator circuit across a D.C. source represented by the terminals 68 and 69. Operating in conjunction with the unijunction transistor 72 as part of the multivibrator circuit 34 is a semiconductor device 71 of a type which is produced commercially by the Transitron Electronic Corporation, Wakefield, Massachusetts, and is known as a "transwitch." The transwitch is similar to a silicon controlled rectifier in its operation, the main difference being that the transwitch may be turned off readily by a negative pulse applied to its base electrode. Connected in circuit with the unijunction transistor 72 is a pulse transformer 86, the secondary winding of which is connected to the gating electrode 23 of the silicon controlled rectifier 14 for the purpose of applying gating pulses thereto. Similarly, a second pulse transformer 84 is connected in series with the transwitch 71 and its secondary winding is connected to the gating electrode 19 of the silicon controlled rectifier 12 in order to apply triggering pulses thereto. As will be explained in further detail below, the multivibrator 34 by virtue of the respective pulse transformers 84 and 86, applies triggering pulses to the respective silicon controlled rectifiers 12 and 14 in alternate phase relationship in order to control conduction therein in a manner described in connection with FIGURE 1.

In the operation of the circuit of FIGURE 2, beginning with the unijunction transistor 72 in the Off condition, voltage across the capacitor 76 builds up as current flows thereto from the terminals 68 and 69. A proportionate amount of the increasing voltage across the capacitor 76 is applied to the base 82 of the transwitch 71 via the variable resistor 75 which may be adjusted to initially determine the duty cycle of the multivibrator 34 and thereby select the value of voltage to be maintained at the output terminals 16. The characteristics of the respective devices 71 and 72 are such that the transwitch 71 is triggered into conduction prior to the point at which the voltage across the capacitor 76 is sufficient to trigger the unijunction transistor 72. When the transwitch 71 conducts, a positive pulse is coupled via the pulse transformer 84 to the gating electrode 19 and serves to trigger the silicon controlled rectifier 12 into conduction. The voltage across the capacitor 76 continues to increase until the triggering potential of the unijunction transistor 72 is reached, at which time conduction is initiated therein and a positive pulse is coupled via the transformer 86 to the gating electrode 23 of the silicon controlled rectifier 14. This causes the silicon controlled rectifier 14 to conduct and apply an extinguishing potential to the silicon controlled rectifier 12. Shortly thereafter the silicon controlled rectifier 14 is turned off by a reverse current developed by the self-quenching network comprising the inductance 44 and the capacitor 45. When the unijunction transistor 72 conducts, the capacitor 76 discharges rapidly until the unijunction transistor 72 becomes extinguished. This action provides a negative pulse which is coupled through the capacitor 74 to the base electrode 82 of the transwitch 71, turning off the transwitch 71 and restoring the circuit to its original state in preparation for a subsequent cycle of operation.

Control of the duty cycle of the multivibrator 34 of FIGURE 2 in accordance with fluctuations in the voltage appearing at the output terminals 16 is effected by the superposition of a feedback signal via the zener diode 38 upon the normal control voltage from the circuit of the unijunction transistor 72 which is present at the base 82 of the transwitch 71. Thus as the voltage across the output terminals 16 tends to increase, the base 82 is driven more negative than its normal potential applied from the circuit of the unijunction transistor 72. In accordance with the invention, this delays the triggering pulse applied to turn on the silicon controlled rectifier 12 without affecting the repetition rate of the pulses produced by the multivibrator 34. The resulting variation in the duty cycle of the waveforms generated by the multivibrator 34 reduces the time during which the silicon controlled rectifier conducts current to the filter 64 and the output terminals 16, thus compensating for the previously experienced slight increase in the voltage at the output terminals 16. An opposite change in the duty cycle of the multivibrator 34 is produced by a decrease in the output voltage across the terminals 16, thus causing the silicon controlled rectifier 12 to conduct more current and thereby compensate for the decrease in output voltage.

It will be clear from the above description of the invention as embodied in the circuits of FIGURES 1 and 2 that the desired voltage regulation is provided, in accordance with an aspect of the invention, through control of the duty cycle, or symmetry, of the output waveform developed by the associated multivibrator. Thus the regulating circuit of the invention is advantageously independent of frequency variations which may result from environmental changes or from fluctuations in component values over a period of time. Accordingly, while the pulse sources employed in the respective arrangements of the invention are arranged to have a substantially constant repetition rate, the resulting voltage regulation is virtually independent of any variations in the pulse repetition rate which may occur from time to time.

While there have been shown and described above certain specific arrangements of a voltage regulating circuit in accordance with the invention for the purpose of illustrating the manner in which the invention may be used to advantage, it will be appreciated that the invention is not limited thereto. Accordingly, any and all modifications, variations and equivalent arrangements falling within the scope of the annexed claims should be considered to be part of the invention.

What is claimed is:

1. A D.C. voltage regulating circuit having input and output terminals and comprising a pair of triggering devices, the first of said devices being connected in series between input and output terminals for controlling the current delivered to the output terminals, the second of said devices being connected in shunt across the input terminals, means for triggering said devices in alternate phase relationship so that the second device, when triggered, serves to turn off the first device, means for generating a transient pulse to turn off the second device whenever said second device is triggered into conduction, and means responsive to the voltage at the output terminals for controlling the triggering means including a multivibrator coupled between the output terminals and the triggering means and having a variable duty cycle.

2. A D.C. voltage regulating circuit having input and output terminals and comprising a pair of triggering devices, the first of said devices being connected in series between input and output terminals for controlling the current delivered to the output terminals, the second of said devices being connected in shunt across the input terminals, means for triggering said devices in alternate phase relationship so that the second device, when triggered, serves to turn off the first device, means for generating a transient pulse to turn off the second device whenever said second device is triggered into conduction, and means responsive to the voltage at the output terminals for controlling the triggering means including repetitively cycling means having a substantially constant frequency, said repetitively cycling means being connected to receive a signal from the output terminals indicative of a voltage thereacross and being connected to apply control signals to the triggering means.

3. A D.C. voltage regulating circuit in accordance with claim 2 further including means for changing the duty cycle of the waveform from the substantially constant frequency cycling means in response to changes in the voltage at the output terminals.

4. A D.C. voltage regulating circuit having input and output terminals and comprising a pair of triggering devices, the first of said devices being connected in series between input and output terminals for delivering current to the output terminals when in the conducting state, the second of said devices being connected in shunt across the input terminals, means for triggering said devices in alternate phase relationship so that the second device, when triggered, serves to turn off the first device, means for generating a transient pulse to turn off the second device whenever said second device is triggered into conduction, a multivibrator connected to the triggering means and having a substantially constant pulse repitition rate for applying pulses to the triggering means, and means coupling the multivibrator to the output terminals for deriving a feedback voltage from the voltage at the output terminals in order to vary the duty cycle of said multivibrator in accordance therewith.

5. A D.C. voltage regulating circuit having input and output terminals and comprising a pair of triggering devices, the first of said devices being connected in series between input and output terminals for delivering current to the output terminals when in the conducting condition, the second of said devices being connected in shunt across the input terminals, said second device being arranged to turn off said first device whenever said second device is triggered into conduction, means for generating a transient pulse to turn off the second device, a multivibrator connected to receive a voltage from the output terminals and having a variable duty cycle, means for controlling the duty cycle of said multivibrator in response to the voltage developed at the output terminals, and means including a pulse transformer connected to the output of the multivibrator to apply triggering pulses of appropriate polarity to the respective first and second devices in accordance with the output waveform of said multivibrator.

6. A D.C. voltage regulating circuit having input and output terminals and comprising a pair of silicon controlled rectifiers, the first of said rectifiers being connected in series between input and output terminals for delivering current to the output terminals when in the conducting condition, the second silicon controlled rectifier being connected in shunt across the input terminals and arranged to extinguish conduction in the first silicon controlled rectifier whenever the second silicon controlled rectifier conducts, means for generating a transient pulse to turn off the second silicon controlled rectifier whenever the second rectifier is turned on, a multivibrator having a variable duty cycle, means for applying a feedback voltage from the output terminals to the multivibrator in order to control the duty cycle thereof in accordance with the output voltage, means for applying triggering pulses to the respective silicon controlled rectifiers in response to the output waveform from the multivibrator comprising a pulse transformer having a primary winding connected to the multivibrator and a pair of secondary windings, each of said secondary windings being connected to the gating electrode of an associated silicon controlled rectifier, and a diode connected across each of said secondary windings and poled in a direction for by-passing pulses thereat which are not effective in triggering the associated silicon controlled rectifiers.

7. A D.C. voltage regulating circuit having input and output terminals and comprising a pair of silicon controlled rectifiers, one of the silicon rectifiers being connected in series between input and output terminals for delivering current to the output terminals during selected intervals, the second silicon controlled rectifier being connected in shunt across the input terminals, each of said silicon controlled rectifiers having cathode, anode and gating electrodes, a multivibrator having a substantially constant repetition rate with a variable duty cycle, means for controlling the duty cycle of said multivibrator in response to variations in the voltage at the output terminals, means for triggering the first silicon controlled rectifier to the conducting condition upon a change of voltage at the output of the multivibrator in one direction, means for triggering the second silicon controlled rectifier to the conducting state upon the change of voltage at the output of the multivibrator in the opposite direction whereby the first silicon controlled rectifier is returned to the non-conducting state by conduction in the second silicon controlled rectifier, said triggering means comprising a pair of pulse transformer secondary windings responsive to the multivibrator output and respectively connected in opposite phase relationship to the gating electrodes of the first and second silicon controlled rectifiers, and a self-quenching circuit connected across the second silicon controlled rectifier comprising a capacitor and an inductance in series for developing a reverse voltage between the anode and cathode of the second silicon controlled rectifier when the second silicon controlled rectifier is triggered to conduction.

8. A D.C. voltage regulating circuit in accordance with claim 7 wherein the multivibrator comprises a first semiconductor device connected in a relaxation oscillator circuit including a first one of the secondary windings and a second semiconductor device connected to a second one of the secondary windings and responsive to control voltages from both the relaxation oscillator circuit and from the output terminals.

9. A D.C. voltage regulating circuit comprising a source of unregulated D.C. voltage, a pair of output terminals, filtering means connected to the output terminals, a first silicon controlled rectifier connected in series between the filtering means and the source of unregulated D.C. voltage, means for repetitively triggering the first silicon controlled rectifier at a substantially constant repetition rate in order to deliver current to the filtering means periodically, a second silicon controlled rectifier connected in shunt across the source of unregulated D.C. voltage for terminating conduction in the first silicon controlled rectifier when conduction is initiated in the second silicon controlled rectifier, means for extinguishing conduction in the second silicon controlled rectifier at a predetermined interval after conduction is initiated therein, and means for controlling the duration of the time interval during which the first silicon controlled rectifier conducts in accordance with the voltage variation at the output terminals.

10. A D.C. regulating circuit in accordance with claim 9 wherein said last-mentioned means comprises a multivibrator having a substantially constant repetition rate with a variable duty cycle.

11. A D.C. voltage regulating circuit in accordance with claim 10 further comprising a pulse transformer connected between the multivibrator and the silicon controlled rectifiers for applying triggering pulses to said silicon controlled rectifiers in opposite phase relationship.

12. A D.C. voltage regulating circuit in accordance with claim 10 further comprising a pair of pulse transformers connected between the multivibrator and the respective silicon controlled rectifiers for coupling triggering pulses of alternate phase thereto.

References Cited by the Examiner

General Electric Controlled Rectifier Manual, copyright Mar. 21, 1960, pages 112, 13 and 122, 26.

Solid-State D-C Switched Regulators, by Albert A. Sorenson, pp. 121–23, Electronics, Nov. 25, 1960.

LLOYD McCOLLUM, *Primary Examiner.*

ROBERT C. SIMS, *Examiner.*